(12) United States Patent
Mannarswamy et al.

(10) Patent No.: US 7,937,565 B2
(45) Date of Patent: May 3, 2011

(54) METHOD AND SYSTEM FOR DATA SPECULATION ON MULTICORE SYSTEMS

(75) Inventors: Sandya Srivilliputtur Mannarswamy, Karnataka (IN); Hariharan Sandanagobalane, Bath (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 589 days.

(21) Appl. No.: 12/034,741

(22) Filed: Feb. 21, 2008

(65) Prior Publication Data

US 2009/0043992 A1    Feb. 12, 2009

(30) Foreign Application Priority Data

Feb. 21, 2007    (IN) .............................. 347/CHE/2007

(51) Int. Cl.
*G06F 9/30* (2006.01)
*G06F 9/40* (2006.01)

(52) U.S. Cl. ........ 712/216; 712/214; 712/218; 712/226; 717/159; 717/148; 717/158; 717/131

(58) Field of Classification Search ................... 717/159, 717/158, 148, 131; 712/214, 218, 226
See application file for complete search history.

(56) References Cited

U.S. PATENT DOCUMENTS

| | | | |
|---|---|---|---|
| 6,959,435 B2 * | 10/2005 | Ju et al. ........................ | 717/158 |
| 7,188,234 B2 * | 3/2007 | Wu et al. ...................... | 712/225 |
| 7,613,906 B2 * | 11/2009 | Rychlik ........................ | 712/218 |
| 2005/0055516 A1 | 3/2005 | Menon et al. | |

OTHER PUBLICATIONS

Postiff et al., "The Store-Load Address Table and Speculative Register Promotion", 2000.*
Gonzalez et al., "Memory Address Prediction for Data Speculation", 1997.*
Lin et al., "Speculative Register Promotion Using Advanced Load Address Table (ALAT)", 2003.*
Bala et al., Dynamo: A Transparent Dynamic Optimization System, 2000.*
Timothy Garnett, "Dynamic Optimization of IA-32 Applications Under DynamoRIO", 2003.*
Jamison D. Collins et al., Dynamic speculative precomputation, International Symposium Microarchitecture, 2001, entire document.
Jamison D. Collins et al., Speculative precomputation: long-range prefetching of delinquent loads, International Conference on Computer Architecture, 2001, entire document.

* cited by examiner

*Primary Examiner* — Alford W Kindred
*Assistant Examiner* — Jesse R Moll (57) ABSTRACT

The method and system for data speculation of multicore systems are disclosed. In one embodiment, a method includes dynamically determining whether a current speculative load instruction and an associated store instruction have same memory addresses in an application thread in compiled code running on a main core using a dynamic helper thread running on a idle core substantially before encountering the current speculative load instruction. The instruction sequence associated with the current speculative load instruction is then edited by the dynamic helper thread based on the outcome of the determination so that the current speculative load instruction becomes a non-speculative load instruction.

22 Claims, 7 Drawing Sheets

METHOD AND SYSTEM FOR DATA SPECULATION ON MULTICORE SYSTEMS

RELATED APPLICATIONS

This patent application claims priority to Indian patent application serial no. 347/CHE/2007, titled "Method and System for Data Speculation on Multicore Systems", filed in India on 21 Feb. 2007, commonly assigned herewith, and hereby incorporated by reference.

FIELD OF TECHNOLOGY

This disclosure relates generally to a technical field of software and/or hardware technology for improving the performance of computer systems and, in one example embodiment, to a method, and system for data speculation on multicore systems are disclosed.

BACKGROUND

With an ever widening performance disparity between processors and memory subsystems, hiding memory latency is becoming increasingly important. In general, whenever a system memory is accessed by a processor, there may be a potential for delay between the time a request for memory is made (either to read or write data) and the time when the memory access is completed. Generally, this delay is referred to as "latency" and can significantly limit the performance of the computer. There can be many sources of such latency. For example, operational constraints with respect to DRAM devices may cause the latency.

Typically, speed of memory circuits may be based upon two timing parameters. The first parameter may be the memory access time, which may be a minimum time required by a memory circuit to set up a memory address, produce, and/or capture data on or from a data bus. A second parameter may be a memory cycle time, which may be the minimum time required between two consecutive accesses to the memory circuit. Upon accessing the system memory, today's processors may have to wait for (e.g., 100 or more clock cycles) to receive the requested data. During this wait, the processor may be stalled, which can result in a significant reduction in processor performance.

Generally, extracting instruction level parallelism and/or better utilization of available processors resources are crucial to increase application performance. However, high memory latency can act as a hindrance to using these techniques. Typically, to avoid stalls due to long latency memory operations, processor architectures may permit some amounts of speculation, such as speculation of load instructions and/or set of instructions that use the loaded value across a possibly aliasing store that may be referred to as data speculation. The speculation of a load instruction and/or a set of dependant instructions across a conditional control flow edge are generally referred to as a control speculation.

Though speculation may help in most cases in reducing memory latency, there are still many situations where speculation of a load instruction can end up in a mispeculation. This can result in a significant processor performance hit, both in terms of execution of the recovery code and/or in terms of loading an unnecessary value in the memory. In case of the control speculation, an incorrect speculation can lead to page-faults as well.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

The method and system for data speculation of multicore systems are disclosed. In the following description, for purposes of explanation, numerous specific details are set forth in order to provide a thorough understanding of the various embodiments. It will be evident, however, to one skilled in the art that the various embodiments may be practiced without these specific details.

The terms "associated store instruction" and "intervening store instruction" are used interchangeably throughout the document. Further, the terms "application core" and "main core" are used interchangeably throughout the document. Furthermore, the terms "dynamic helper thread" and "helper thread" are used interchangeably throughout the document.

In one embodiment, a method for data speculation in multicore systems is disclosed, the method includes dynamically determining whether a current speculative load instruction and an associated store instruction have same memory addresses in an application thread in compiled code running on a main core using a dynamic helper thread running on a idle core substantially before encountering the current speculative load instruction and editing instruction sequence associated with the current speculative load instruction by the dynamic helper thread based on the outcome of the determination so that the current speculative load instruction becomes a non-speculative load instruction.

In another embodiment, a method includes determining available candidate load instructions for data speculation in source code during compilation of source code, determining, using a combination of code analysis and heuristic approaches, whether a current candidate load instruction in the determined available candidate load instructions and an intervening store instruction are both likely to have same memory address. If a current candidate load instruction in the determined available candidate load instructions and an intervening store instruction are likely to have same memory addresses, then insert a dynamic helper thread substantially before the current candidate load instruction, dynamically determining whether the current candidate load instruction and associated store instruction have same memory addresses using the dynamic helper thread running on a idle core. If the current candidate load instruction and associated store instruction have same memory addresses, then allow the candidate load instruction to execute normally using the source code instructions and repeat the above steps for a next candidate load instruction in the determined candidate load instructions. If a current candidate load instruction in a determined available candidate load instructions and an intervening store instruction do not have the same memory address, then replace the current candidate load instruction with a current speculative load instruction in the source code for execution in an application thread running on a main core. Similarly, if the current candidate load instruction and associated store instruction have same memory addresses, then allow the candidate load instruction to do data speculation by inserting data speculation instruction.

In yet another embodiment, a method includes determining available candidate load instructions for data speculation in source code during compilation of source code, determining, using a combination of code analysis and heuristic approaches, whether a current candidate load instruction in the determined available candidate load instructions and an intervening store instruction are both likely to have same memory address. If the current candidate load instruction in the determined available candidate load instruction and the intervening store instruction are likely to have same memory addresses, then adding code in recovery code to count number of times data speculation was mispeculated during execution, determine whether the counted number of times the data speculation was mispeculated is equal to or greater than a predetermined value and if counted number of times the data speculation was mispeculated is equal to or greater than the predetermined value, then trigger a dynamic helper thread which includes instruction to dynamically patch the current candidate load instruction in the source code to not to use data speculation. If the current candidate load instruction in the determined available candidate load instruction and the intervening store instruction are not likely to have same memory addresses, insert a current speculative load instruction in the source code for the current candidate load instruction to execute in an application thread running on a main core.

In another embodiment, an article includes a storage medium having instructions, that when executed by a computing platform, result in execution of a method for data speculation in multicore systems, the instructions includes dynamically determining whether a current speculative load instruction and an associated store instruction have same memory addresses in compiled code using a dynamic helper thread running on a idle core substantially before encountering the current speculative load instruction and editing instruction sequence associated with the current speculative load instruction in an application thread running on a main core based on the outcome of the determination so that the current speculative load instruction becomes a non-speculative load instruction.

In yet another embodiment, an article includes a storage medium having instructions, that when executed by a computing platform, result in execution of a method for data speculation in multicore systems, the instructions includes determining available candidate load instructions for data speculation in source code during compilation of source code, determining, using a combination of code analysis and heuristic approaches, whether a current candidate load instruction in the determined available candidate load instructions and an intervening store instruction are both likely to have same memory address. If the current candidate load instruction in the determined available candidate load instructions and the intervening store instruction are likely to have same memory addresses, then add code in recovery code to count number of times data speculation was mispeculated during execution, determine whether the counted number of times the data speculation was mispeculated is equal to or greater than a predetermined value and if the counted number of times the data speculation was mispeculated is equal to or greater than the predetermined value, then trigger a dynamic helper thread which includes instruction to dynamically patch the current candidate load instruction in the source code to stop using data speculation.

In another embodiment, an article includes a storage medium having instructions, that when executed by a computing platform, result in an execution of a method for data speculation in multicore systems, the instructions includes determining available candidate load instructions for data speculation in source code during compilation of source code, determining, using a combination of code analysis and heuristic approaches, whether a current candidate load instruction in the determined available candidate load instructions and an intervening store instruction are both likely to have same memory address. If the current candidate load instruction in the determined available candidate load instructions and the intervening store instruction are likely to have same memory addresses, then add code in recovery code to count number of times data speculation was mispeculated during execution, determine whether counted number of times the data speculation was mispeculated is equal to or greater than a predetermined value, if counted number of times the data speculation was mispeculated is equal to or greater than a predetermined value, then trigger a dynamic helper thread which includes instruction to dynamically patch the current candidate load instruction in the source code to not to use data speculation. If a current candidate load instruction in the determined available candidate load instructions and an intervening store instruction are not likely to have same memory address, then insert a current speculative load instruction in the source code for the current candidate load instruction to execute in an application thread running on a main core.

In yet another embodiment, a computer system includes multiple processor cores, and a memory coupled to the processor core, the memory having stored therein code for data speculation in multicore systems, the code causes the processor to dynamically determining whether a current speculative load instruction and an associated store instruction have same memory addresses in compiled code using a dynamic helper thread running on a idle core substantially before encountering the current speculative load instruction and editing instruction sequence associated with the current speculative load instruction in an application thread running on a main core based on the outcome of the determination so that the current speculative load instruction becomes a non-speculative load instruction.

Figure 1:
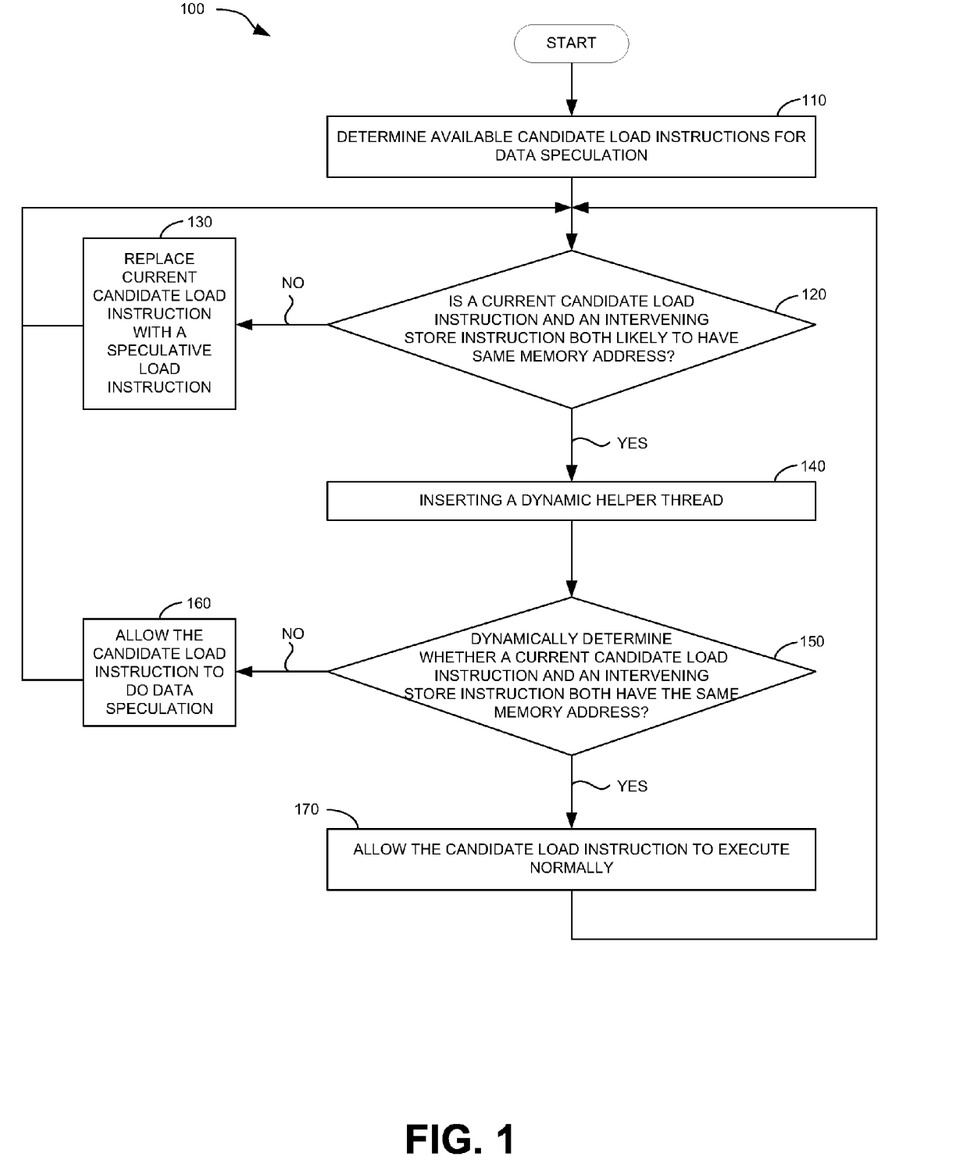
FIG. 1 is a flowchart illustrating a method for data speculation using dynamic helper threads on multicore systems according to one embodiment.

FIG. 1 is a flowchart illustrating a method for data speculation using dynamic helper threads on multicore systems according to an embodiment. The term "multicore" refers to having more than one processor in a computer chip or an integrated circuit. In operation 110, available candidate load instructions for data speculation in a source code may be determined during compilation of the source code. In operation 120, it may be determined whether a current candidate load instruction in the determined available candidate load instructions and an intervening store instruction are both likely to have the same memory address using a combination of code analysis and heuristic approaches. In some embodiments, the determination of whether a current candidate load instruction and an intervening store instruction are both likely to have same memory address is done using a combination of code analysis and heuristic approaches. In these embodiments, code analysis is done using the code analysis phases in the compiler. Further in these embodiments, the scheduler component in the compiler speculates using the heuristic approaches. Also in these embodiments, using the code analysis information and the heuristics in the compiler helps facilitate in determining whether the current load instruction is safe to speculate or not to increase the use of data speculation by the compiler.

If the memory address associated with the current candidate load instruction and the intervening store instruction are likely to be the same, then it will perform the operation 140. In operation 140, the dynamic helper thread may be inserted substantially before the current candidate load instruction. In operation 150, it may be determined whether the candidate load instruction and the intervening store instruction have the same memory address using the dynamic helper thread running on an idle core.

If the memory address associated with the current candidate load instruction and the intervening store instruction are the same, then operation 170 may be performed. In operation 170, the candidate load instruction may be allowed to execute normally using the source code instructions. The process may be repeated for the next candidate load instruction in the determined load instructions by performing the operation 120.

On the other hand, if the condition in the operation 120 is not satisfied, then operation 130 is performed. In operation 130, the current candidate load instruction may be replaced with a speculative load instruction and may perform the operation 120 on the next candidate load instruction. Similarly, if the condition in the operation 150 is not satisfied, then the operation 160 is performed in which, the candidate load instruction may be allowed to do data speculation by inserting data speculation instruction and may perform the operation 120 on the next candidate load instruction.

For example, an available candidate load instructions for data speculation (e.g., operation 110 of FIG. 1) in the source code may be determined during a compilation of the source code. In addition, it may be determined using a combination of code analysis and heuristic approaches, whether the current candidate load instruction in the determined available candidate load instructions and the intervening store instruction are both likely to have same memory address (e.g., operation 120 of FIG. 1).

Furthermore, the current candidate load instruction may be replaced with the current speculative load instruction in the source code (e.g., operation 130 of FIG. 1) for an execution in the application thread running on the main core if the memory address associated with the available candidate load instruction and the intervening store instruction are not likely to be the same. Also, the dynamic helper thread (e.g., operation 140 of FIG. 1) may be inserted substantially before the current candidate load instruction if the memory address associated with the available candidate load instruction and the intervening store instruction are likely to be the same. Further, dynamically determining whether the current candidate load instruction and associated store instruction have same memory addresses using the dynamic helper thread (e.g., operation 150 of FIG. 1) running on the idle core.

Furthermore, the candidate load instruction may be allowed to do data speculation (e.g., operation 160 of FIG. 1) by inserting the data speculation instruction if the memory address associated with the current candidate load instruction and associated store instruction are not the same. In addition, the candidate load instruction may be allowed to execute normally (e.g., operation 170 of FIG. 1) using source code instructions if the memory address associated with the current candidate load instruction and associated store instruction are the same. Moreover, the above steps may be repeated for a next candidate load instruction in the determined candidate load instructions.

Figure 2:
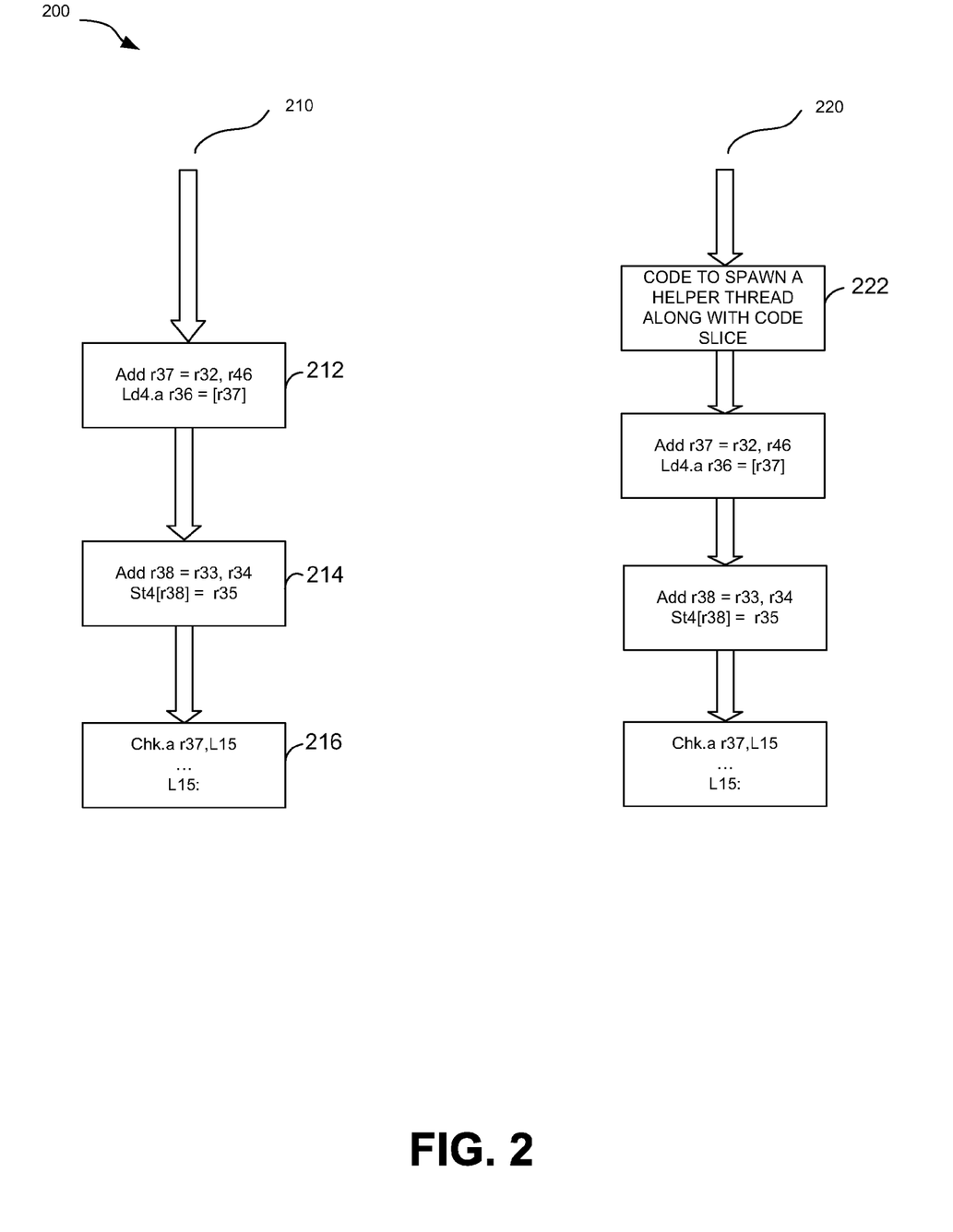
FIGS. 2 and 3 are flowcharts illustrating the operation of an application thread running on a main core and a dynamic helper thread running on an idle core according to one embodiment.
Figure 3:
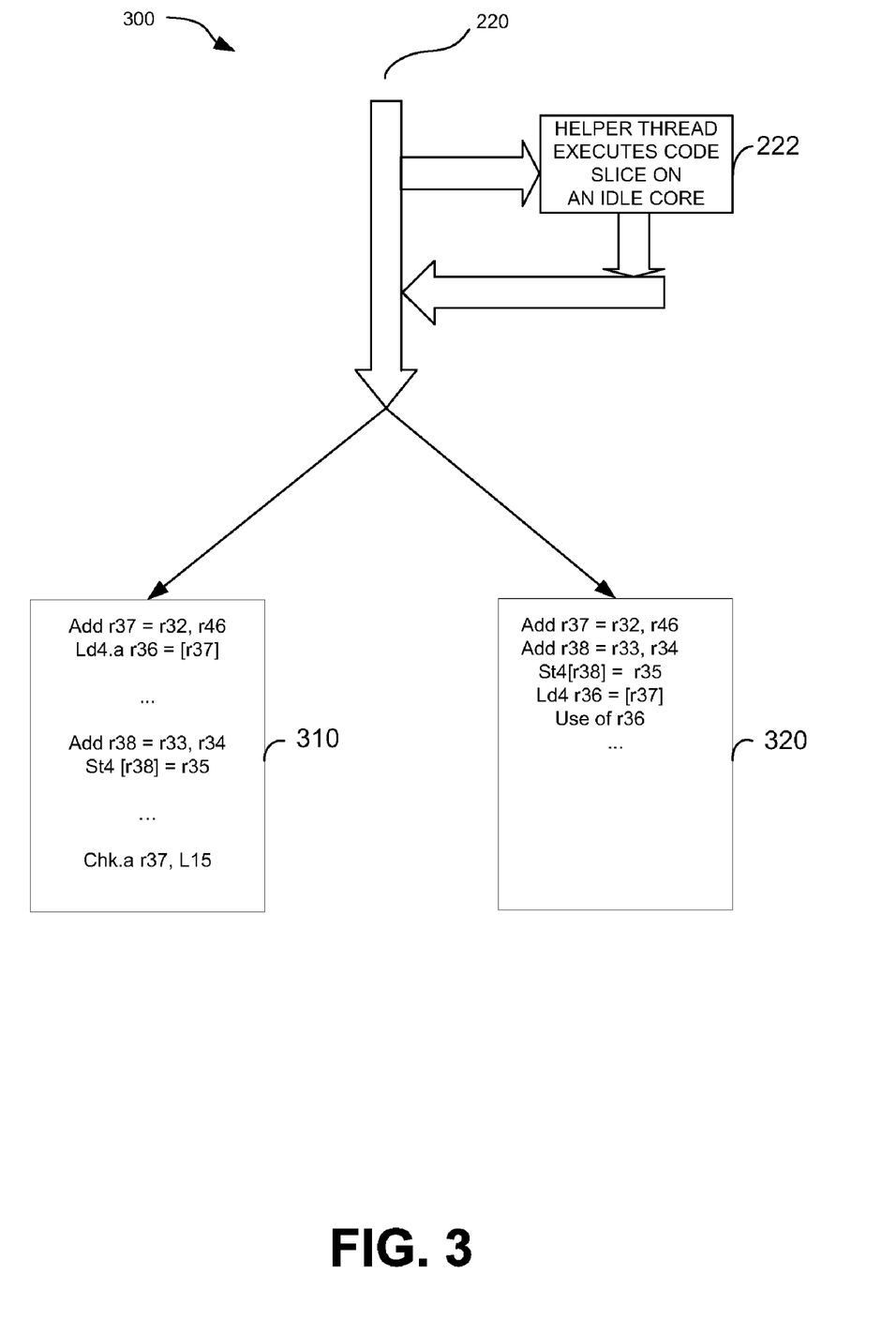

FIGS. 2 and 3 are flowcharts 200 and 300 illustrating the operation of an application thread 210 running on a main core without the dynamic helper thread approach and a dynamic helper thread approach 220 showing how the compiled code looks like when using the dynamic helper thread approach according to an embodiment. In operation, an original speculative code is shown in the application thread 210 having a long latency load instruction 212 and a store instruction 214. For example, if the loaded value r36 is being used substantially immediately after the load instruction in the application thread 210, and if the load takes about 100 cycles to complete, then to use the loaded value r36, the processor has to wait nearly 100 cycles. In order to reduce such latency, the compiler changes the load instruction Ld4 to Ld4.$a$, where the .$a$ indicates that it is a speculative load instruction, and moves the speculative load instruction substantially before the store instruction 214 as shown in the load instruction 212. The compiler then inserts a Chk instruction 216 in place of the load instruction that was in the source code. Original speculative code may be an available candidate load instruction for data speculation in the source code during compilation of the source code. During execution of the source code if the load and store instructions 212 and 214 have different addresses then the Chk instruction will not have any effect on the and the source code will normally. However, during execution of the source code if the load and store instructions 212 and 214 have same addresses, then the Chk instruction will branch to another address that will recompute the value.

In operation, the compiler inserts a trigger instruction in the application thread 210 substantially ahead of the Ld4.$a$ speculative load instruction that spawns the helper thread 220 along with a code slice 222 that checks for whether the load instruction 212 and the intervening store instruction 214 have same addresses. Based on the result of the checking, the present technique decides to go a speculative code 310 or the non-speculative code 320 as shown in FIG. 3. In these embodiments, the code slice may determine whether memory addresses associated with the current candidate load instruction and the associated load instruction are same are not. The code slice may further create the dynamic helper thread 220 as shown in FIGS. 2 and 3. The dynamic helper thread 220 on idle core may be executed before the execution of available candidate load instructions.

For example, it may be dynamically determined whether the current speculative load instruction and the associated store instruction have same memory addresses in the application thread (e.g., operation 120 of FIG. 1) in compiled code running on the main core using the dynamic helper thread running on the idle core substantially before encountering the current speculative load instruction.

The instruction sequence associated with the current speculative load instruction may be edited by the dynamic helper thread based on an outcome of determination so that the current speculative load instruction becomes the non-speculative load instruction. Furthermore, dynamically determining whether the current speculative load instruction and the associated store instruction have same memory addresses in the compiled code (e.g., operation 150 of FIG. 1) may include dynamically determining whether the current speculative load instruction and the associated store instruction have the same memory addresses in the compiled code using the dynamic helper thread running on the idle core substantially before encountering the current speculative load instruction. In addition, an associated current non-speculative load instruction in the source code may be executed in the application thread running on the main core without using the current speculative load instruction compiled by a compiler if the current speculative load instruction and the associated store instruction have the same memory addresses. On the other hand, the current speculative load instruction may be executed in the application thread running on the main core if the current speculative load instruction and the associated store instruction do not have the same memory addresses. Furthermore, the available candidate load instructions for the data speculation may be determined (e.g., operation 410 of FIG. 4) during compilation of the source code. In addition, using the combination of code analysis and heuristic approaches, it may be determined whether the current candidate load instruction in the determined available candidate load instructions is likely to have same memory address with any intervening store instruction (e.g., operation 420 of FIG. 4). Furthermore, the current speculative load instruction in the source code for the current candidate load instruction may be inserted to execute in the application thread running on the main core (e.g., operation of FIG. 1). On the other hand, the dynamic helper thread running on the idle core may be substantially inserted before encountering the current speculative load instruction to determine whether the current speculative load instruction and the associated store instruction have the same memory addresses in the compiled code and/or to allow the current speculative load instruction to do the data speculation, based on the determination. Moreover, it may be dynamically determined whether the current speculative load instruction and the associated store instruction have same memory addresses, the main core and the idle core are located in a same central processing unit (CPU)

FIG. 3 is a continuation of operation 220 of FIG. 2. FIG. 3 shows an active helper thread approach which may use dynamic execution sequence. In one embodiment, the current speculative load instructions in the application thread and the associated store instructions may be dynamically executed while running on the main core. In another embodiment, before encountering current speculative load instruction, the dynamic helper thread may run on the idle core. The dynamic helper thread may dynamically determine whether the current speculative load instruction and the associated store instruction have the same memory address in the compiled code or not.

For example, dynamically determining whether the current candidate load instruction and the associated store instruction have the same memory addresses may include extracting instruction slices in the source code associated with the current candidate load instruction and the associated store instruction that may facilitate in determining the memory addresses, creating the dynamic helper thread (e.g., operation 220 of FIG. 3) associated with extracted instruction slices, inserting the created dynamic helper thread substantially before the current candidate load instruction so that the dynamic helper thread can determine whether the current load instruction and the associated store instruction have the same memory addresses.

Furthermore, compiler transformations (e.g., the compiler transformations may include instructions associated with program routines selected from group consisting of loop unrolling, common sub-expression elimination, constant propagation and loop interchange) may be applied to the extracted instruction slices in the source code.

Also, inserting the created dynamic helper thread (e.g., operation 460 of FIG. 4) may include inserting a trigger point substantially before the current candidate load instruction for initiating and inserting code associated with the dynamic helper thread. In some embodiments, the inserted trigger point triggers the dynamic helper thread to patch the main thread to turn speculation off. Moreover, the dynamic helper thread may be dynamically invoked upon encountering the inserted code associated with the extracted instruction slices to determine whether the memory address associated with the current candidate load instruction and the associated store instruction are the same and to edit an instruction sequence associated with the current speculative load instruction to be the current non-speculative load instruction.

In some embodiments, the compiler extracts address computation code out of both the load instruction and its associated store instruction. The instructions associated with address computation along with a comparison of the addresses may form the code slice for the helper thread. In these embodiments, a trigger point is identified in the source code by the compiler from where the helper thread can be triggered. This trigger point is inserted substantially in advance of the speculative load instruction in the instruction schedule. Further in these embodiments, the compiler generates code for the dynamic patching, i.e., the code slice, which the helper thread can execute depending on the result of the comparison.

In some embodiments, if the load and store instructions in the source code are in a loop or other constructs, the compiler might choose to do routine compiler transformations, such as loop unrolling, interchange and so on for the extracted code slice to make the extracted code slice simple and effective. Also, in these embodiments, during run time the helper thread may execute the code slice and determine if the load and store addresses in the source code are the same. If they are the same, then the above process may choose to execute the version of the source code that is not speculative. If they are different, then the data speculation code is executed by the above process.

Figure 4:
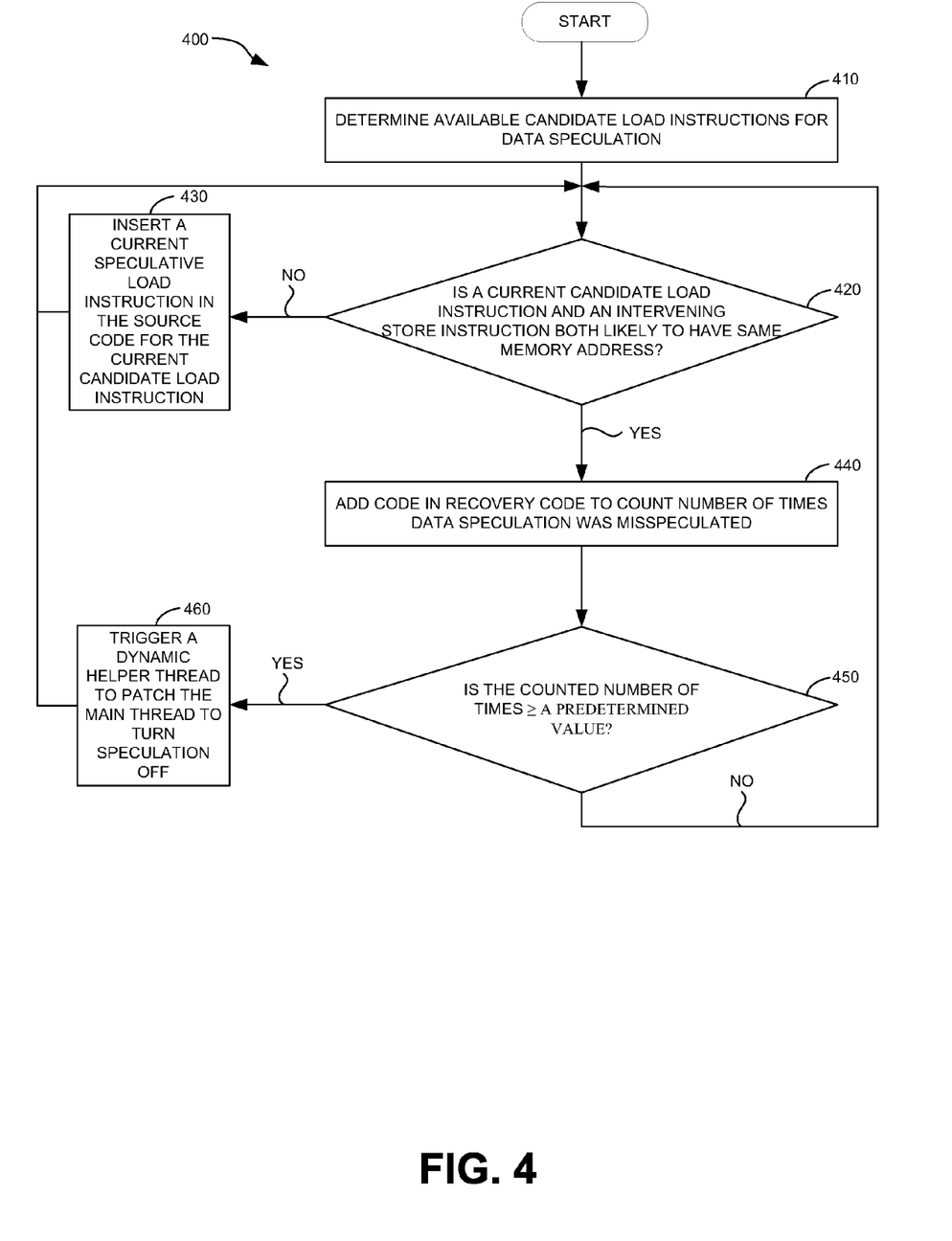
FIG. 4 is a flowchart illustrating a method for data speculation using dynamic helper threads on multicore systems according to another embodiment.

FIG. 4 is a flowchart illustrating a method for data speculation using dynamic helper threads on multicore systems according to another embodiment. In operation 410, available candidate load instruction for data speculation in the source code is determined during compilation of the source code. In operation 420, it is determined whether the current candidate load instruction and an intervening store instruction have same memory address or not, that may be carried out using a combination of code analysis and heuristic approaches. In operation 440, the code is added in a recovery code to count number of times data speculation was mispeculated during execution, if the current candidate load instruction and the intervening store instruction are likely to have same memory address.

In operation 450, it is determined whether the counted number of times the data is mispeculated is greater than or equal to the predetermined value. In operation 460, the dynamic helper thread (e.g., the dynamic helper thread may include an instruction for dynamically patching the current candidate load instruction in the source code for not using data speculation) is triggered, if the counted number of times the data is mispeculated is greater than or equal to a predetermined value. If the counted number of times mispeculated data is not greater than or equal to the predetermined value, the steps of determining for a next candidate load instruction in the determined available candidate load instructions is repeated through operation 420.

On the other hand, if the condition in the operation 420 is not satisfied then operation 430 will be performed. In operation 430, the current speculative load instruction is inserted in the source code for the current candidate load instruction to execute in the application thread running on the main core and may perform the operation 420.

For example, available candidate load instructions for data speculation in a source code may be determined during compilation of the source code (e.g., operation 410 of FIG. 4). In addition, using the combination of code analysis and heuristic approaches, it may be determined whether the current candidate load instruction in the determined available candidate load instructions and the intervening store instruction are both likely to have same memory address (e.g., operation 420 of FIG. 4).

Furthermore, the current speculative load instruction in the source code for the current candidate load instruction may be inserted (e.g., operation 430 of FIG. 4) to execute in the application thread running on main core if the memory address associated with the available candidate load instructions and the intervening store instruction are not likely to be the same. On the other hand, code in the recovery code may be added to count number of times the data speculation was mispeculated (e.g., operation 440 of FIG. 4) during an execution if the memory address associated with the available candidate load instructions and the intervening store instruction is likely to be the same.

In addition, it may be determined whether counted number of times the data speculation was mispeculated is equal to or greater than the predetermined value (e.g., operation 450 of FIG. 4). Furthermore, the dynamic helper thread which may include instruction that may be triggered (e.g., Operation 460 of FIG. 4) to dynamically patch the current candidate load instruction in the source code to stop using data speculation if the counted number of times the data speculation was mispeculated is equal to or greater than the predetermined value.

Moreover, the steps of determining for a next candidate load instruction in the determined available candidate load instructions may be repeated if the counted number of times the data speculation was mispeculated is not equal to or greater than the predetermined value (e.g., operation 420 of FIG. 4).

In some embodiments, the compiler generates the recovery code which can maintain a counter to count the number of mispeculations. Further, during run time, when the application executes, the results of data speculation are aggregated in the recovery code and are used to update the speculation action in the main thread. Once the counter exceeds a threshold value or a preset count, the code associated with this technique would trigger a helper thread to patch the original sequential code to turn off speculation. In these embodiments, the code for the patching is determined and inserted by the compiler.

Figure 5:
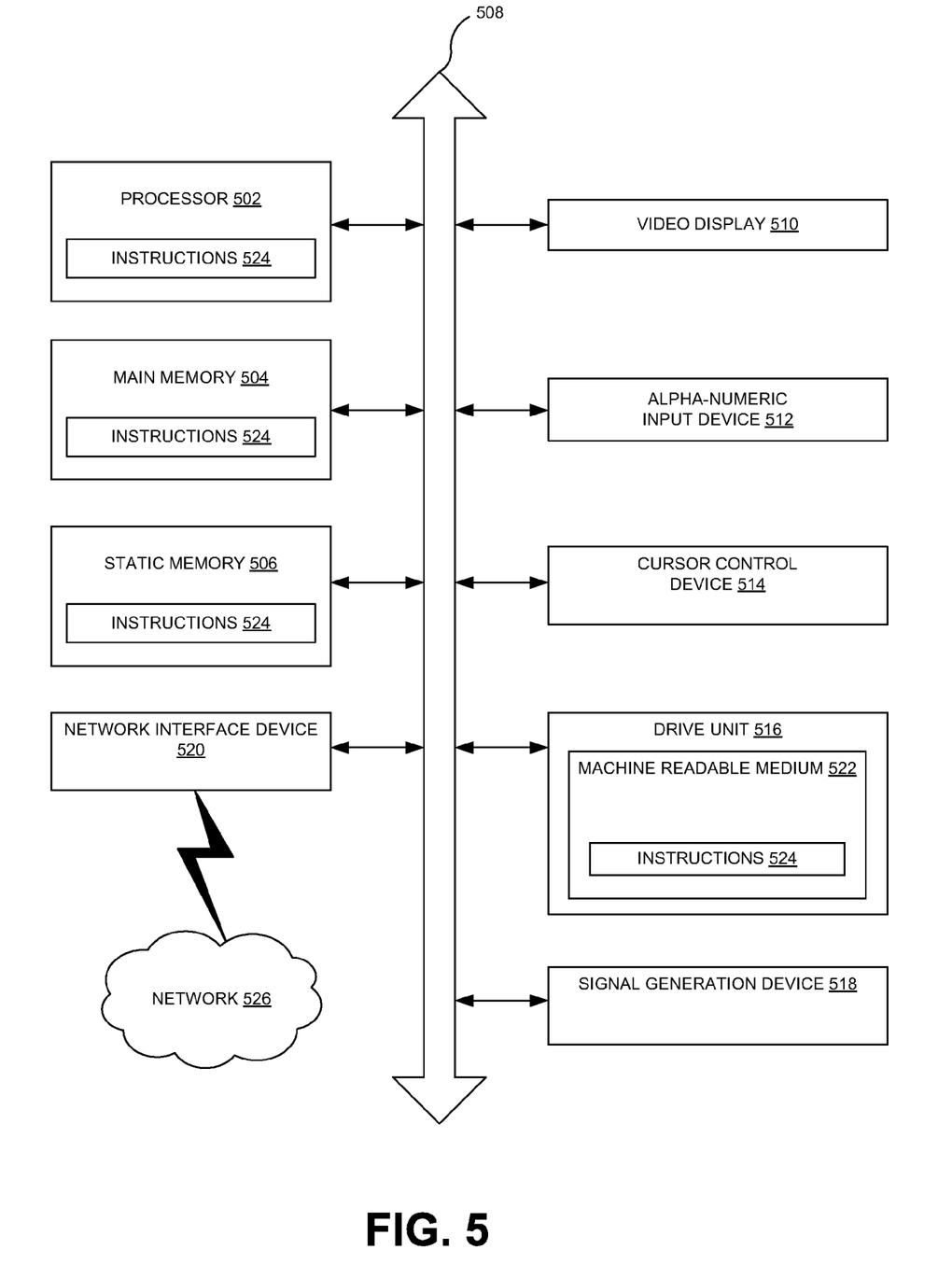
FIG. 5 is a diagrammatic system view of a data processing system in which any of the embodiments disclosed herein may be performed, according to one embodiment.

FIG. 5 is a diagrammatic system view 500 of a data processing system in which any of the embodiments disclosed herein may be performed, according to one embodiment. Particularly, the diagrammatic system view 500 of FIG. 5 illustrates a processor 502, a main memory 504, a static memory 506, a bus 508, a video display 510, an alpha-numeric input device 512, a cursor control device 514, a drive unit 516, a signal generation device 518, a network interface device 520, a machine readable medium 522, instructions 524, and a network 526, according to one embodiment.

The diagrammatic system view 500 may indicate a personal computer and/or a data processing system in which one or more operations disclosed herein are performed. The processor 502 may be microprocessor, a state machine, an application specific integrated circuit, a field programmable gate array, etc. (e.g., Intel® Pentium® processor). The main memory 504 may be a dynamic random access memory and/or a primary memory of a computer system. The static memory 506 may be a hard drive, a flash drive, and/or other memory information associated with the data processing system. The bus 508 may be an interconnection between various circuits and/or structures of the data processing system. The video display 510 may provide graphical representation of information on the data processing system. The alpha-numeric input device 512 may be a keypad, keyboard and/or any other input device of text (e.g., a special device to aid the physically handicapped). The cursor control device 514 may be a pointing device such as a mouse. The drive unit 516 may be a hard drive, a storage system, and/or other longer term storage subsystem.

The signal generation device 518 may be a bios and/or a functional operating system of the data processing system. The network interface device 520 may perform interface functions (e.g., code conversion, protocol conversion, and buffering) required for communications to and from a network between a number of independent devices (e.g., of varying protocols). The machine readable medium 522 may provide instructions on which any of the methods disclosed herein may be performed. The instructions 524 may provide source code and/or data code to the processor 502 to enable any one/or more operations disclosed herein.

For example, an article includes a storage medium having instructions. The instructions when executed by a computing platform result in an execution of a method for a data speculation in multicore systems that includes dynamically determining whether a current speculative load instruction and an associated store instruction have same memory addresses in a compiled code using a dynamic helper thread running on a idle core substantially before encountering the current speculative load instruction.

Also, the storage medium having instructions to edit an instruction sequence associated with the current speculative load instruction in an application thread running on the main core based on outcome of the determination so that the current speculative load instruction becomes the non-speculative load instruction.

Furthermore, dynamically determining whether the current speculative load instruction and the associated store instruction have the same memory addresses in the compiled code includes dynamically determining whether the current speculative load instruction and the associated store instruction have the same memory addresses in the compiled code using the dynamic helper thread running on the idle core substantially before encountering the current speculative load instruction.

In addition, the associated current non-speculative load instruction in the source code in the application thread running on the main core may be executed without using the current speculative load instruction compiled by the compiler if the memory address associated with current speculative load instruction and the associated store instruction is same. Similarly, the current speculative load instruction in the application thread running on the main core may be executed if the memory address associated with the current speculative load instruction and the associated load instruction is not same.

Furthermore, the article includes the storage medium having instructions. The instructions when executed by a computing platform results in an execution of a method for a data speculation in multicore systems that includes determining available candidate load instructions for data speculation in source code during compilation of source code.

The storage medium having instructions to determine whether a current candidate load instruction in the determined available candidate load instructions and the intervening store instruction are likely to have same memory address using the combination of code analysis and heuristic approaches. The storage medium having instructions to insert the created dynamic helper thread includes inserting the trigger point substantially before the current candidate load instruction for initiating and inserting the code associated with the dynamic helper thread, a current speculative load instruction in the source code for the current candidate load instruction to execute in an application thread running on a main core if the memory address associated with the available candidate load instructions and the intervening store instruction are not likely to be the same. Similarly, the storage medium having instructions to add code in the recovery code to count number of times the data speculation was mispeculated during execution if the memory address associated with the available candidate load instructions and the intervening store instruction are likely to be the same.

Furthermore, the storage medium having instructions to determine whether the counted number of times the data speculation was mispeculated is equal to or greater than a predetermined value. In addition, the storage medium having instruction to trigger the dynamic helper thread that contains the instruction to dynamically patch the current candidate load instruction in the source code to stop using the data speculation.

Also, the storage medium having instructions to apply compiler transformations (e.g., the compiler transformations include instructions associated with program routines selected from a group consisting of a loop unrolling, common sub-expression elimination, a constant propagation and loop interchange) to extracted instruction slices in the source code. The storage medium may have instructions to invoke dynamically the dynamic helper thread upon encountering the inserted code associated with the extracted instruction slices to determine whether the memory address associated with the current candidate load instruction and the associated store instruction is same or not.

Furthermore, the article includes the storage medium having instructions. The storage medium having instructions that when executed by a computing platform, result in an execution of a method for the data speculation in multicore systems includes determining available candidate load instructions for the data speculation in the source code during compilation of the source code. The storage medium having instructions to determine whether current candidate load instruction in the determined available candidate load instructions and an intervening store instruction are likely to have same memory address using a combination of code analysis and heuristic approaches.

Furthermore, the storage medium having instructions to insert a current speculative load instruction in the source code for the current candidate load instruction to execute in the application thread running on the main core if the memory address associated with the available candidate load instruction and the intervening store instruction are not likely to be the same. Similarly, the storage medium having instructions to add code in the recovery code to count number of times data speculation was mispeculated during the execution.

Moreover, the storage medium having instructions to determine whether the counted number of times the data speculation was mispeculated is equal to or greater than a predetermined value. In addition, the storage medium having instructions to trigger the dynamic helper thread which includes the instruction to dynamically patch the current candidate load instruction in the source code to not to use the data speculation if the counted number of times the data speculation was mispeculated is equal to or greater than the predetermined value. The storage medium may have instructions to repeating the steps of determining for a next candidate load instruction in the determined available candidate load instructions if counted number of times the data speculation was mispeculated is not equal to or greater than the predetermined value.

A computer system includes multiple processor cores. The memory coupled to the processor core, the memory having stored therein a code for a data speculation in multicore systems. The code stored in the memory causes the processor to dynamically determining whether the current speculative load instruction and the associated store instruction have same memory addresses in compiled code using a dynamic helper thread running on the idle core substantially before encountering the current speculative load instruction. In addition, the code stored in the memory causes the processor to edit instruction sequence associated with the current speculative load instruction in an application thread running on the main core based on the outcome of the determination so that the current speculative load instruction becomes the non-speculative load instruction.

Furthermore, dynamically determining whether the current speculative load instruction and the associated store instruction have same memory addresses in the compiled code includes dynamically determining whether the current speculative load instruction and the associated store instruction have the same memory addresses in the compiled code using the dynamic helper thread running on the idle core substantially before encountering the current speculative load instruction.

The code stored in the memory causes the processor to execute the associated current non-speculative load instruction in the source code in the application thread running on the main core without using the current speculative load instruction compiled by the compiler if the memory address associated with the available current speculative load instruction and the associated store instruction is same. On the other hand, the code causes the processor to execute the current speculative load instruction in the application thread running on the main core if the memory address associated with the available current speculative load instruction and the associated store instruction is not same.

The code stored in the memory causes the processor to determine available candidate load instruction for the data speculation during the compilation of the source code. Furthermore, the code causes the processor to determine whether a current candidate load instruction in the determined available candidate load instruction and an intervening store instruction are likely to have same memory address.

The code stored in the memory causes the processor to insert the current speculative load instruction in the source code for the current candidate load instruction to execute in the application thread running on the main core if the memory address associated with the available candidate load instruction and the intervening store are not likely to be the same. Similarly, the code causes the processor to use the dynamic helper thread running on the idle core substantially before encountering the current speculative load instruction to determine whether the current speculative load instruction and the associated store instruction have the same memory addresses in the compiled code and to allow the current speculative load instruction to do the data speculation based on the determination.

Figure 6:
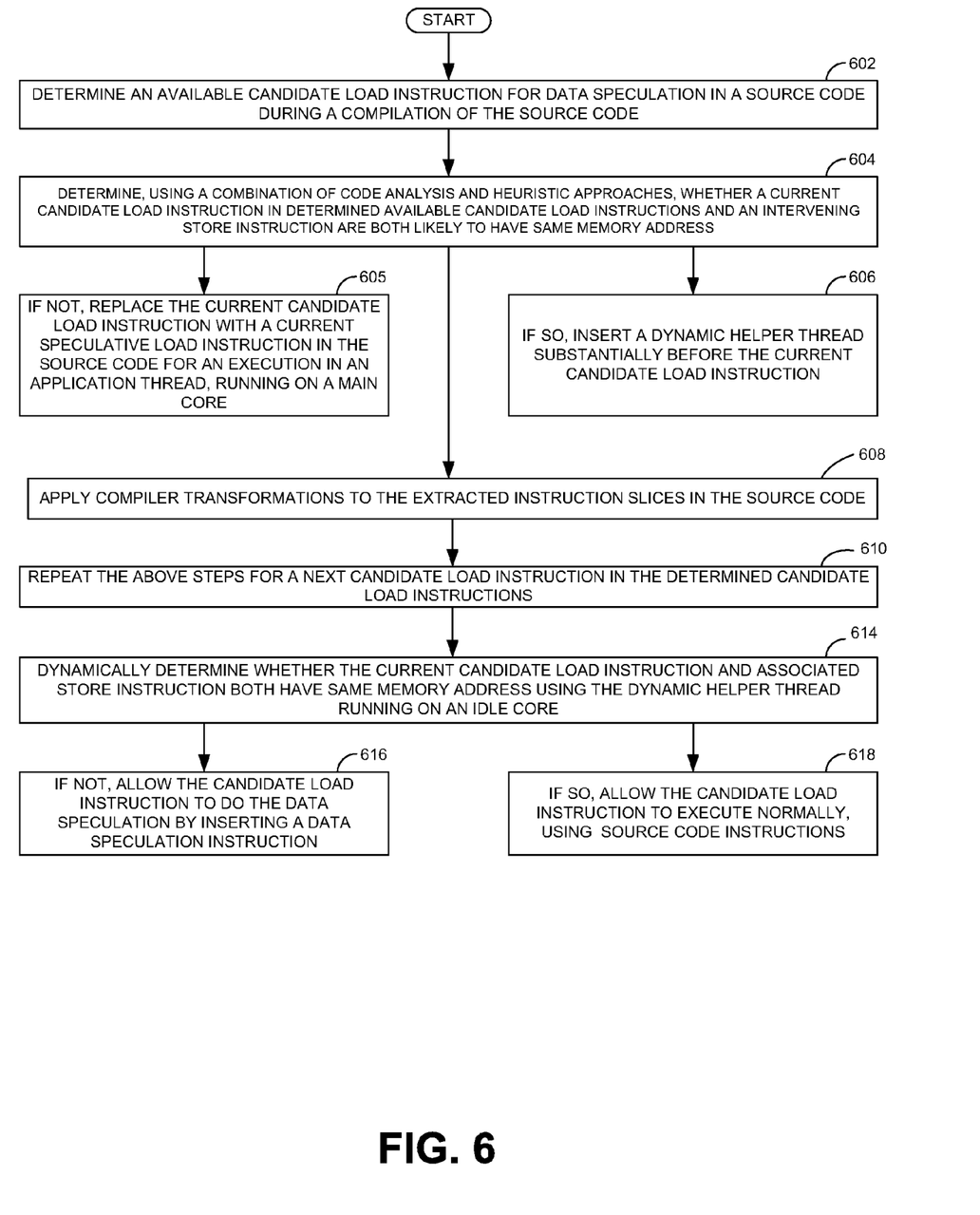
FIG. 6 is a process flow of allowing the candidate load instruction to execute using the source code instructions, according to one embodiment.

FIG. 6 is a process flow of allowing the candidate load instruction to execute using the source code instructions, according to one embodiment. In operation 602, available candidate load instructions for data speculation in source code may be determined during a compilation of the source code. In operation 604, it may be determined using a combination of code analysis and heuristic approaches, whether a current candidate load instruction in the determined available candidate load instructions and an intervening store instruction are both likely to have same memory address.

If the current candidate load instruction in the determined available candidate load instructions and an intervening store instruction are not likely to have same memory address then, in operation 605, the current candidate load instruction may be replaced with a current speculative load instruction in the source code for an execution in an application thread, running on a main core.

If the current candidate load instruction in the determined available candidate load instructions and an intervening store instruction are likely to have same memory address then, in operation 606, a dynamic helper thread may be substantially inserted before the current candidate load instruction. In operation 608, compiler transformations may be applied to the extracted instruction slices in the source code. In operation 610, the above steps may be repeated for a next candidate load instruction in the determined candidate load instructions.

In operation, the dynamic helper thread may be dynamically invoked upon encountering an inserted code associated with the extracted instruction slices to determine whether the memory address associated with the current candidate load instruction and the associated store instruction are same and to edit an instruction sequence associated with the current speculative load instruction to be the current non-speculative load instruction. In operation 614, it may be dynamically determined whether the current candidate load instruction and associated store instruction have same memory addresses using the dynamic helper thread running on an idle core.

If the current candidate load instruction and associated store instruction do not have same memory addresses then, in operation 616, the candidate load instruction may be allowed to do the data speculation by inserting a data speculation instruction. If the current candidate load instruction and associated store instruction have same memory addresses then, in operation 618, the candidate load instruction may be allowed to execute normally, using source code instructions.

Figure 7:
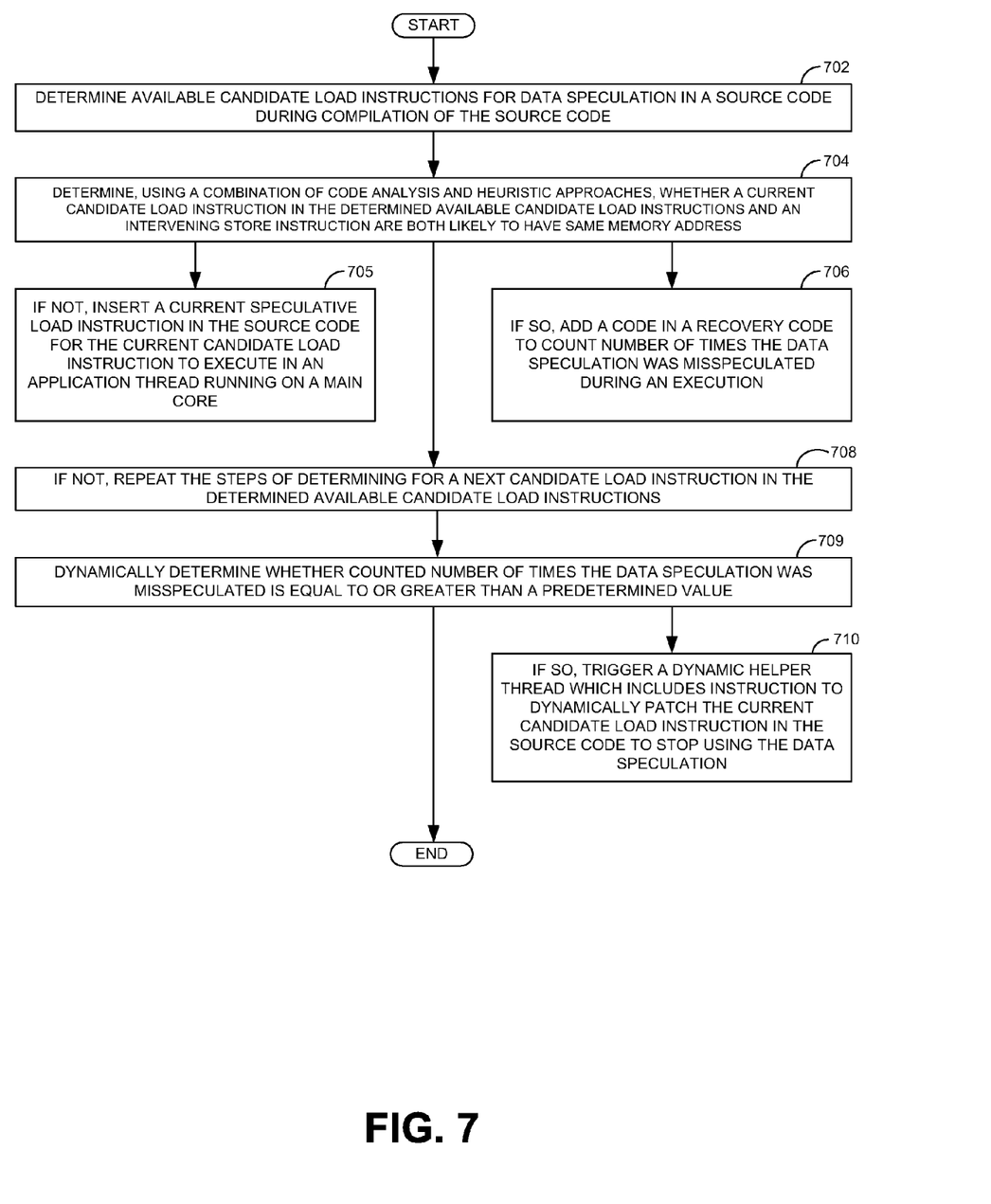
FIG. 7 is a process flow of triggering a dynamic helper thread, according to one embodiment.

FIG. 7 is a process flow of trigger a dynamic helper thread, according to one embodiment. In operation 702, available candidate load instructions may be determined for data speculation in a source code during compilation of the source code. In operation 704, it may be determined, using a combination of code analysis and heuristic approaches, whether a current candidate load instruction in the determined available candidate load instructions and an intervening store instruction are both likely to have same memory addresses.

If the available candidate load instructions and the intervening store instruction are not likely to have same memory addresses then, in operation 705, a current speculative load instruction in the source code may be inserted for the current candidate load instruction to execute in an application thread running on a main core. If available candidate load instructions and an intervening store instruction have the same memory addresses, then, in operation 707, code may be added in recovery code to count number of times the data speculation was mispeculated during an execution.

In operation 708, it is determined whether counted number of times the data speculation was mispeculated is equal to or greater than a predetermined value. If counted number of times the data speculation was mispeculated is equal to or greater than a predetermined value, in operation 708, a dynamic helper thread which includes instruction to dynamically patch the current candidate load instruction in the source code may be triggered to stop using the data speculation.

If counted number of times the data speculation was mispeculated is not equal to or greater than a predetermined value then, in operation 710, the steps of determining for a next candidate load instruction in the determined available candidate load instructions may be repeated.

Also, the method may be in a form of a machine-readable medium embodying a set of instructions that, when executed by a machine, cause the machine to perform any method disclosed herein. It will be appreciated that the various embodiments discussed herein may not be the same embodiment, and may be grouped into various other embodiments not explicitly disclosed herein.

The above technique allows the compiler to speculate freely by inserting data speculation instructions where needed during compiling of the source code. Using the code analysis and the heuristic approach on an idle core the present technique facilitates during execution of the source code in an application core whether to use or not the inserted data speculation instructions.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

The above description is intended to be illustrative, and not restrictive. Many other embodiments will be apparent to those skilled in the art. The scope of the subject matter should therefore be determined by the appended claims, along with the full scope of equivalents to which such claims are entitled.

As shown herein, the present subject matter can be implemented in a number of different embodiments, including various methods, a circuit, an I/O device, a system, and an article comprising a machine-accessible medium having associated instructions.

Other embodiments will be readily apparent to those of ordinary skill in the art. The elements, algorithms, and sequence of operations can all be varied to suit particular requirements. The operations described-above with respect to the method illustrated in FIG. 1 can be performed in a different order from those shown and described herein.

FIGS. 1-7 are merely representational and are not drawn to scale. Certain proportions thereof may be exaggerated, while others may be minimized. FIGS. 1-7 illustrate various embodiments of the subject matter that can be understood and appropriately carried out by those of ordinary skill in the art.

In the foregoing detailed description of the embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive invention lies in less than all features of a single disclosed embodiment. Thus, the following claims are hereby incorpo-

What is claimed is:

1. A method for data speculation in multicore systems, the method comprising the steps of:
dynamically determining whether a current speculative load instruction and an associated store instruction have same memory addresses in an application thread in compiled code running on a main core using a dynamic helper thread running on an idle core, substantially before encountering the current speculative load instruction; and
editing instruction sequence associated with the current speculative load instruction by the dynamic helper thread based on an outcome of a determination so that the current speculative load instruction becomes a non-speculative load instruction.

2. The method of claim 1, wherein dynamically determining whether the current speculative load instruction and the associated store instruction have same memory addresses in the compiled code comprises:
dynamically determining whether the current speculative load instruction and the associated store instruction have the same memory addresses in the compiled code using the dynamic helper thread running on the idle core substantially before encountering the current speculative load instruction;
if so, executing the associated current non-speculative load instruction in source code in the application thread running on the main core without using the current speculative load instruction compiled by a compiler; and
if not, executing the current speculative load instruction in the application thread running on the main core.

3. The method of claim 2, further comprising:
determining available candidate load instructions for the data speculation during compilation of the source code;
determining, using a combination of code analysis and heuristic approaches, whether a current candidate load instruction in the determined available candidate load instructions is likely to have same memory address with any intervening store instruction;
if not, inserting the current speculative load instruction in the source code for the current candidate load instruction to execute in the application thread running on the main core; and
if so, using the dynamic helper thread running on the idle core substantially before encountering the current speculative load instruction to determine whether the current speculative load instruction and the associated store instruction have the same memory addresses in the compiled code and to allow the current speculative load instruction to do the data speculation, based on the determination.

4. The method of claim 1, wherein dynamically determining whether the current speculative load instruction and the associated store instruction have same memory addresses, the main core and the idle core are located in a same central processing unit (CPU).

5. A method, comprising:
determining available candidate load instructions for data speculation in a source code during a compilation of the source code;
determining, using a combination of code analysis and heuristic approaches, whether a current candidate load instruction in a determined available candidate load instructions and an intervening store instruction are both likely to have same memory address;
if not, replacing the current candidate load instruction with a current speculative load instruction in the source code for an execution in an application thread, running on a main core;
if so, inserting a dynamic helper thread substantially before the current candidate load instruction;
dynamically determining whether the current candidate load instruction and associated store instruction have same memory addresses using the dynamic helper thread running on an idle core;
if not, allowing the candidate load instruction to do the data speculation by inserting a data speculation instruction;
if so, allowing the candidate load instruction to execute normally, using source code instructions; and
repeating the above steps for a next candidate load instruction in the determined candidate load instructions.

6. The method of claim 5, wherein dynamically determining whether the current candidate load instruction and the associated store instruction have the same memory addresses comprises:
extracting instruction slices in the source code associated with the current candidate load instruction and the associated store instruction that facilitates in determining the memory addresses;
creating the dynamic helper thread associated with extracted instruction slices; and
inserting the created dynamic helper thread substantially before the current candidate load instruction so that the dynamic helper thread can determine whether the current load instruction and the associated store instruction have the same memory addresses.

7. The method of claim 6, further comprising:
applying compiler transformations to the extracted instruction slices in the source code for execution in the helper thread, wherein the compiler transformations include instructions associated with program routines selected from the group consisting of loop unrolling, common sub-expression elimination, constant propagation and loop interchange.

8. The method of claim 6, wherein inserting the created dynamic helper thread comprises:
inserting a trigger point substantially before the current candidate load instruction for initiating and inserting code associated with the dynamic helper thread.

9. The method of claim 8, further comprising:
dynamically invoking the dynamic helper thread upon encountering an inserted code associated with the extracted instruction slices to determine whether the memory address associated with the current candidate load instruction and the associated store instruction are same and to edit an instruction sequence associated with the current speculative load instruction to be a current non-speculative load instruction.

10. A method, comprising:
determining available candidate load instructions for data speculation in a source code during compilation of the source code;
determining, using a combination of code analysis and heuristic approaches, whether a current candidate load instruction in the determined available candidate load instructions and an intervening store instruction both are likely to have same memory addresses;
if not, inserting a current speculative load instruction in the source code for the current candidate load instruction to execute in an application thread running on a main core;

if so, adding a code in a recovery code to count number of times the data speculation was mispeculated during an execution;

determining whether counted number of times the data speculation was mispeculated is equal to or greater than a predetermined value; and if so, triggering a dynamic helper thread which includes instruction to dynamically patch the current candidate load instruction in the source code to stop using the data speculation.

11. The method of claim 10, further comprising:
if not, repeating the steps of determining for a next candidate load instruction in the determined available candidate load instructions.

12. An article comprising:
a storage medium having instructions, that when executed by a computing platform, result in an execution of a method for data speculation in multicore systems, comprising:

dynamically determining whether a current speculative load instruction and an associated store instruction have same memory addresses in compiled code using a dynamic helper thread running on an idle core substantially before encountering the current speculative load instruction; and editing an instruction sequence associated with the current speculative load instruction in an application thread running on a main core based on the outcome of a determination so that the current speculative load instruction becomes a non-speculative load instruction.

13. The article of claim 12, wherein dynamically determining whether the current speculative load instruction and the associated store instruction have same memory addresses in the compiled code comprises:

dynamically determining whether the current speculative load instruction and the associated store instruction have the same memory addresses in the compiled code using the dynamic helper thread running on the idle core, substantially before encountering the current speculative load instruction;

if so, executing the associated current non-speculative load instruction in the source code in the application thread running on the main core without using the current speculative load instruction compiled by a compiler; and if not, executing the current speculative load instruction in the application thread, running on the main core.

14. An article comprising:
a storage medium having instructions, that when executed by a computing platform, result in an execution of a method for data speculation in multicore systems, comprising:

determining available candidate load instructions for data speculation in source code during compilation of source code;

determining, using a combination of code analysis and heuristic approaches, whether a current candidate load instruction in the determined available candidate load instructions and an intervening store instruction are both likely to have same memory address;

if not, inserting a current speculative load instruction in the source code for the current candidate load instruction to execute in an application thread running on a main core;

if so, adding code in recovery code to count number of times data speculation was mispeculated during execution;

determining whether the counted number of times the data speculation was mispeculated is equal to or greater than a predetermined value; and if so, triggering a dynamic helper thread which includes instruction to dynamically patch the current candidate load instruction in the source code to stop using data speculation.

15. The article of claim 14, further comprising:
applying compiler transformations to extracted instruction slices in the source code for execution in the helper thread, wherein the compiler transformations include instructions associated with program routines selected from a group consisting of a loop unrolling, common sub-expression elimination, constant propagation and loop interchange.

16. The article of claim 15, wherein inserting a created dynamic helper thread comprises:
inserting a trigger point substantially before the current candidate load instruction for initiating and inserting the code associated with the dynamic helper thread.

17. The article of claim 16, further comprising:
dynamically invoking the dynamic helper thread upon encountering the inserted code associated with the extracted instruction slices to determine whether the memory addresses associated with the current candidate load instruction and the associated store instruction are the same and to edit an instruction sequence associated with the current speculative load instruction to be a current non-speculative load instruction.

18. An article comprising:
a storage medium having instructions, that when executed by a computing platform, result in an execution of a method for data speculation in multicore systems, comprising:

determining available candidate load instructions for data speculation in source code during compilation of source code;

determining, using a combination of code analysis and heuristic approaches, whether a current candidate load instruction in the determined available candidate load instructions and an intervening store instruction are both likely to have same memory address;

if not, inserting a current speculative load instruction in the source code for the current candidate load instruction to execute in an application thread running on a main core;

if so, adding code in recovery code to count number of times data speculation was mispeculated during execution;

determining whether the counted number of times the data speculation was mispeculated is equal to or greater than a predetermined value; and if so, triggering a dynamic helper thread which includes instruction to dynamically patch the current candidate load instruction in the source code to not to use data speculation.

19. The article of claim 18, further comprising:
if not, repeating the steps of determining for a next candidate load instruction in the determined available candidate load instructions.

20. A computer system comprising:
multiple processor cores; and
a memory coupled to the processor core, the memory having stored therein code for data speculation in multicore systems, the code causes the processor to perform a method comprising:

dynamically determining whether a current speculative load instruction and an associated store instruction have same memory addresses in compiled code using a dynamic helper thread running on a idle core substantially before encountering the current speculative load instruction; and editing instruction sequence associated with the current speculative load instruction in an application thread running on a main core based on the outcome of the determination so that the current speculative load instruction becomes a non-speculative load instruction.

21. The system of claim 20, wherein dynamically determining whether the current speculative load instruction and the associated store instruction have same memory addresses in the compiled code comprises:

dynamically determining whether the current speculative load instruction and the associated store instruction have the same memory addresses in the compiled code using the dynamic helper thread running on the idle core substantially before encountering the current speculative load instruction;

if so, executing the associated current non-speculative load instruction in the source code in the application thread running on the main core without using the current speculative load instruction compiled by the compiler; and if not, executing the current speculative load instruction in the application thread running on the main core.

22. The system of claim 21, further comprising:

determining available candidate load instructions for data speculation during compilation of the source code;

determining, using a combination of code analysis and heuristic approaches, whether a current candidate load instruction in the determined available candidate load instructions and an intervening store instruction are both likely to have same memory address;

if not, inserting the current speculative load instruction in the source code for the current candidate load instruction to execute in the application thread running on the main core; and if so, using the dynamic helper thread running on the idle core substantially before encountering the current speculative load instruction to determine whether the current speculative load instruction and the associated store instruction have the same memory addresses in the compiled code and to allow the current speculative load instruction to do data speculation based on the determination.

* * * * *